United States Patent Office 3,600,452
Patented Aug. 17, 1971

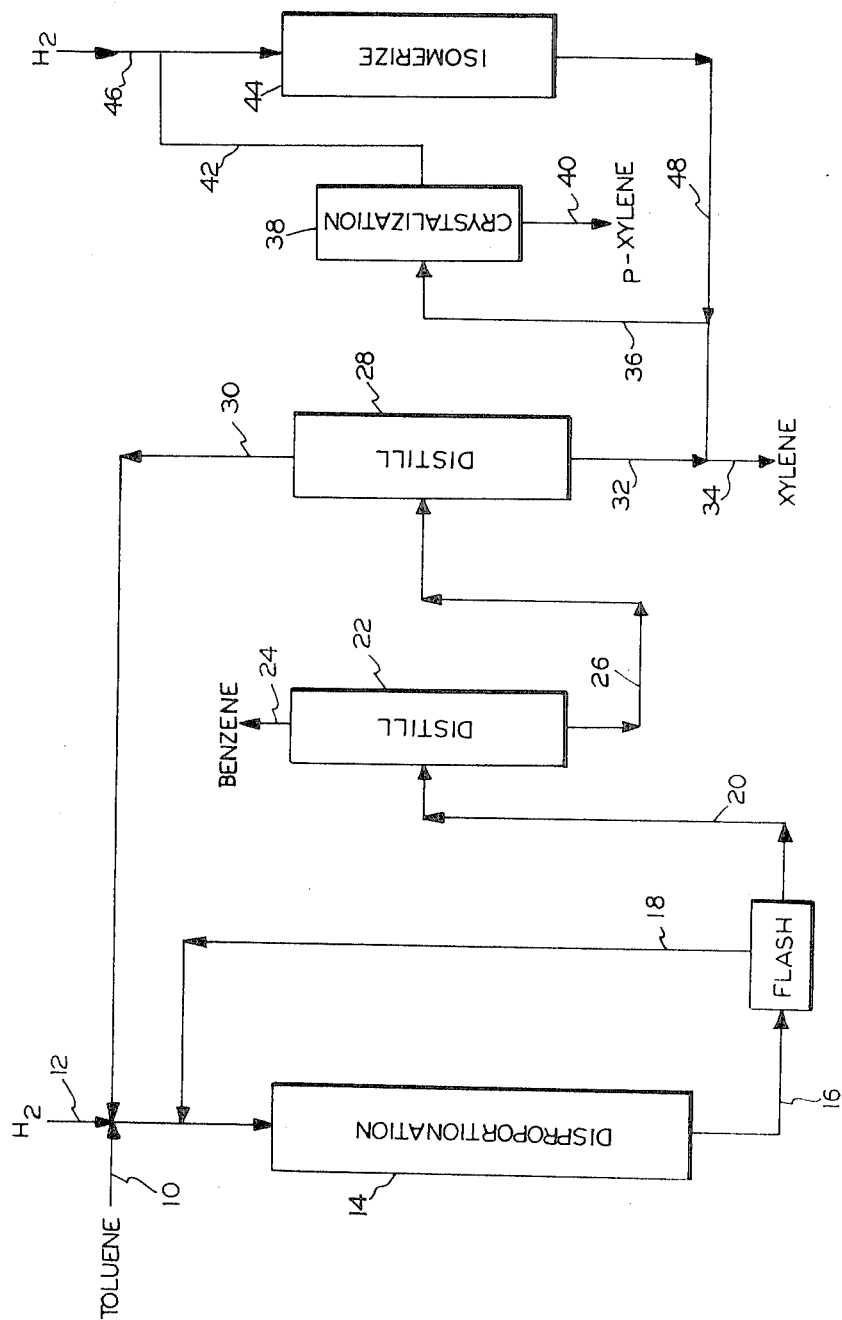

3,600,452
ALKYL TRANSFER OF ALKYL AROMATICS WITH METALS OF GROUPS V-B, VII-B, I-B, AND II-B ON BORIA-ALUMINA
Stephen M. Kovach and Ronald A. Kmecak, Ashland, Ky., assignors to Ashland Oil & Refining Company, Houston, Tex.
Filed Dec. 19, 1968, Ser. No. 785,194
Int. Cl. B01j 11/06; C07c 3/58, 15/08
U.S. Cl. 260—672
12 Claims

ABSTRACT OF THE DISCLOSURE

A process for the alkyl transfer of alkyl aromatics, including contacting an alkyl aromatic feed material, such as toluene, with a catalyst comprising a metal selected from Group I-B, such as copper or silver, Group II-B, such as zinc or cadmium, Group V-B, such as vanadium, and Group VII-B, such as manganese, and boria deposited on an alumina base at a temperature of about 800 to 1100° F., a pressure of about 0 to 2000 p.s.i.g., and a liquid hourly space velocity of about 0.1 to 10, and in the presence of hydrogen introduced at a rate of about 1 to 10 moles hydrogen per mole of hydrocarbon feed. Promoters selected from Group I, Group II, Group IV, and the rare earth metals of the Periodic System may be added to the catalyst. Deactivated catalyst may be periodically rejuvenated by discontinuing the introduction of aromatic feed material and purging with hydrogen and the catalyst can be reactivated by calcination in an atmosphere such as air. Where toluene is the feed, the alkyl transfer product may be distilled to separate benzene, toluene and xylenes, the toluene may be recycled to the alkyl transfer step, the xylenes may be crystallized to separate para-xylene from the remaining xylenes, the mother liquor from the crystallization step may thereafter be isomerized to readjust the para-xylene content and the product of the isomerization may be recycled to the crystallization zone.

BACKGROUND OF THE INVENTION

The present invention relates to a process for the catalytic conversion of hydrocarbons and, more particularly, to a process for the catalytic alkyl transfer of alkyl aromatics.

Aromatic hydrocarbons, such as benzene, naphthalene, and their alkyl derivatives are important building blocks in the chemical and petrochemical industries. For example, benzene and its derivatives have numerous uses; cyclohexane is utilized in nylon production; naphthalene is utilized in the production of phthalic anhydride for alkyd resins, etc.; para-xylene can be used for the production of terephthalic acid which, in turn is utilized in the production of synthetic resins, such as dacron, mylar, etc., etc.

For many years, the primary source of such aromatic hydrocarbons has been coal tar oils obtained by the pyroolysis of coal to produce coke. Such tar oils contain principally benzene, toluene, naphthalene, methylnaphthalene and para-xylene. Benzene may be produced from such oils by direct separation, such as distillation techniques, the para-xylene may be separated by crystallization, and the naphthalene fractions by direct separation techniques. Further alkyl derivatives of benzene and naphthalene can be converted to increased volumes of benzene and naphthalene by hydrodealkylation.

More recently, however, the petroleum industry has become a leading source of these aromatic hydrocarbons. The reason for this has been the availability of the catalytic reforming process in which naphthene hydrocarbons are dehydrogenated to produce a reformate rich in aromatics and more efficient processes for separating the aromatics from the reformate.

Some years ago, there was a high demand for toluene which was used in the production of TNT. This led to the building of substantial facilities for its production. However, the advent of nuclear and fusion weaponry and the use of diesel oil-ammonium nitrate explosives has left toluene in substantial over-supply, since the only major uses of toluene are as a solvent, the production of toluene diisocyanates and the production of benzene. This has resulted in extensive efforts to develop methods for converting toluene to benzene. One method of converting toluene to benzene is by the previously mentioned hydrodealkylation.

Dealkylation has the primary disadvantage that methane is a major product. Volume yields of benzene are therefore low and carbon deposition on the catalyst is high. The large amounts of methane, while useful as a fuel, require expensive techniques for the removal of the methane from the circulating hydrogen stream utilized in the hydrodealkylation. In addition, large quantities of hydrogen are consumed in the dealkylation process and hydrogen is often in short supply and expensive to produce. Finally, where catalysts are used in the process, carbon laydown on the catalyst is a serious problem.

A more profitable reaction for changing alkyl aromatics to other aromatic products is an alkyl transfer reaction. An alkyl transfer reaction is a process wherein alkyl groups are caused to be transferred from the nuclear carbon atoms of one aromatic molecule to the nuclear carbon atoms of another aromatic molecule. By way of example, an aromatic hydrocarbon molecule containing one nuclear alkyl substituent, such as toluene, may be treated by disproportionation to produce an aromatic hydrocarbon with no alkyl substituents, namely, benzene, and aromatic hydrocarbon molecules with two nuclear alkyl substituents, namely xylenes. Similarly, product ratios may be shifted by transalkylation of xylene and benzene to toluene. Such an alkyl transfer reaction has distinct advantages: methane is not produced, but instead, valuable aromatic hydrocarbons are produced in addition to the desired aromatic hydrocarbon. As a result, there is very little loss of product in alkyl transfer as opposed to hydrodealkylation.

Alkyl transfer may be carried out thermally. However, thermal alkyl transfer results in demethylation due to cracking and hydrogenation, ultimately resulting in low yields of desired aromatics. On the other hand, catalytic alkyl transfer has not been highly successful since it requires an active, rugged, acidic catalyst. Typical catalysts are solid oxides, such as silica-alumina, silica-magnesium, etc. These materials, however, are not active enough to promote disproportionation at high conversion rates. In addition, as is the case in hydrodealkylation, carbon deposition on the catalyst and its affect on catalyst activity with time is a severe problem.

It is therefore an object of the present invention to provide an improved process for the conversion of alkyl aromatics. Another object of the present invention is to provide an improved process for the alkyl transfer of alkyl aromatics. Yet another object of the present invention is to provide an improved process for the disproportionation of toluene to produce benzene and xylenes. Another and further object of the present invention is to provide an improved process for the disproportionation of alkyl aromatics which utilizes a novel catalyst system. Another object of the present invention is to provide an improved process for the disproportionation of alkyl aromatics with a catalyst system resistant to carbon laydown. A further object of the present invention is to provide an improved process for the catalytic disproportionation of alkyl aromatics utilizing a Group I–B, II–B, V–B or VII–B metal and boria on an alumina base. A further object of the present invention is to provide an improved process for the disproportionation of alkyl aromatics utilizing critical conditions of temperature and pressure which produce maximum disproportionation and conversion of one aromatic to another. Still another object of the present invention is to provide an improved process for the conversion of toluene to benzene and xylenes and conversion of meta- and ortho-xylenes to additional para-xylene. These and other objects and advantages of the present invention will be apparent from the following detailed description.

SUMMARY OF THE INVENTION

Briefly, in accordance with the present invention, alkyl transfer of alkyl aromatics comprises contacting an alkyl aromatic feed material with a catalyst comprising a metal of Group I–B, II–B, V–B or VII–B of the Periodic System or mixtures thereof and boria deposited on an alumina base. Further improvement of the catalyst is obtained by adding a Group I, Group II, Group IV, a Rare Earth metal or mixtures thereof. Further improvements of the process are obtained by maintaining the temperature between about 800 and 1100° F. and the pressure between about 0 and 2000 p.s.i.g. Where toluene is the feed, additional para-xylene is produced by isomerizing ortho- and meta-xylenes.

BRIEF DESCRIPTION OF THE DRAWINGS

The drawing shows a flow diagram of a process system in accordance with the present invention.

DETAILED DESCRIPTION OF THE INVENTION

Alkyl aromatic feed materials for use in accordance with the present invention can be any alkyl aromatic having at least one transferrable alkyl group. Primary materials are alkyl aromatics having from 7 to 15 carbon atoms, mixtures of such alkyl aromatic hydrocarbons, or hydrocarbon fractions rich in such alkyl aromatic hydrocarbons. Such feeds include mono- and di-aromatics, such as alkyl benzenes and alkyl naphthalenes. Preferably, the alkyl group should contain no more than about 4 carbon atoms. A preferred feed in accordance with the present invention is toluene. Accordingly, disproportionation of toluene will be referred to hereinafter in the detailed description.

The process of the present invention should be conducted at a temperature between about 800 and 1100° F., and preferably between 850 and 1000° F. It has been found in accordance with the present invention that below this temperature range, substantially decreased conversion occurs due to hydrogenation. On the other hand, when operating above this temperature range, thermal demethylation occurs. The pressure utilized in accordance with the present invention has also been determined to be a critical factor. Accordingly, the process should be carried out between about 0 and 2000 p.s.i.g. and preferably, between 300 to 600 p.s.i.g. It has been found that below the desired pressure range, conversion is low and the aromaticity of the product is high. On the other hand, at higher pressures, conversion is high, but liquid recoveries are low due to hydrogenation and hydrocracking. A liquid hourly space velocity between about 0.1 and 10, and preferably between 0.25 and 1.0, should be utilized and a hydrogen-to-hydrocarbon mole ratio between about 1 and 10 to 1 and preferably between 2 and 4 to 1 is desired.

The high severity conditions required to obtain disproportionation of alkyl aromatics, particularly the disproportionation of toluene, has been found to lead the catalyst deactivation due to selective adsorption and condensation of aromatics on the catalyst surface and carbon laydown on the catalyst. It was found that the condensation and adsorption of aromatics on the catalyst is a temporary poison and that this condition can be alleviated by utilizing high hydrogen partial pressures. In addition, this temporary deactivation of the catalyst can be overcome to completely rejuvenate the catalyst to near virgin activity by hydrogen-purging of the catalyst in the absence of aromatic hydrocarbon feed. While coke or carbon deposition on the catalyst is a permanent poison, it has been found, in accordance with the present invention, that carbon laydown can be decreased by utilizing the catalysts of the present invention. Further, it was found that when these catalysts become deactivated by carbon laydown, they can be restored to near virgin activity by regeneration in air.

The catalyst employed in accordance with the present invention is a multi-faceted cure for many of the ills of catalytic disproportionation reactions. First, it has been found that boria deposited on an alumina base is vastly superior to a silica-alumina base catalyst; the former consistently proving to be twice as active as the latter. The amount of boria deposited on the alumina may vary between about 5 and 25% by weight of the finished catalyst. The alumina is preferably a gamma alumina. Such gamma aluminas are very stable up to temperatures of about 1800° F. One such alumina, Boehmite, may be prepared in a variety of ways, one of the simplest being the addition of ammonium hydroxide to a water solution of aluminum chloride. The material originally precipitated is an amorphous alumina flock which rapidly grows to crystal size yielding crystalline Boehmite. Aging of Boehmite in ammonium hydroxide solution transforms the Boehmite first to the meta-stable Bayerite and finally to the highly stable Gibbsite. The Bayerite is preferred and may be in its beta- or eta-form.

The active metal added to the boria-alumina may include a Group I–B metal, such as copper, silver, etc., a Group II–B metal, such as zinc, cadmium, etc., a Group V–B metal, such a vanadium, etc., a Group VII–B metal, such as manganese, etc., or mixtures of these metals. These metals are preferably in their oxide form. The active metal concentration may be between about 2 and 20% and preferably is between 4 and 6% by weight of the finished catalyst.

It has also been found that conversion may be improved and, more significantly, carbon laydown on the catalyst may be reduced by the addition thereto of a promoter. Such promoters may be selected from Group IA of the Periodic System, such as potassium, rubidium, cesium, etc., Group II–A of the Periodic System, such as calcium, magnesium, strontium, etc., a Rare Earth metal of the Periodic System, such as cerium, thorium, etc., a Group IV metal of the Periodic System, such as tin or lead, or mixtures of these, and particularly mixtures of a Group IV metal with one of the other groups mentioned. The promoters are preferably in their oxide form and are present in amounts of about 1 to 15% by weight based on the weight of the finished catalyst.

The catalysts may be prepared by techniques well known in the art. For example, such preparation may include coprecipitation or impregnation techniques. One can employ extrudates or pellets for impregnation or powders followed by pelletization or extrusion to yield the finished catalyst. When employing impregnation techniques, the metals may be added to the base singly or in combination, utilizing water soluble salts such as borates, boric acid, halides, nitrates, sulfates, acetates, etc. Easily hydrolyzed salts can be kept in solution without decomposition by employing the appropriate inorganic acids. Well-known procedures for drying and calcination of the catalyst will also be employed. For example, vacuum drying at a temperature of about 250° F. and calcination in an oxidative, neutral or reductive atmosphere, utilizing a calcination temperature of about 800 to 1200° F. can be practiced.

Preparation of a specific catalyst is illustrated below.

To 200 ml. of distilled water was added 25 g. of vanadyl sulfate and 31 g. of boric acid. The solution was heated until all the metal salts went into solution. This hot solution was added slowly to 250 ml. of bayerite alumina and allowed to stand for 15 minutes. At the end of this period, the liquid was decanted from the impregnated alumina. The resulting catalyst was dried at 250° F. for 1 hour in a vacuum oven and then calcined in a muffle furnace at 950° F. in air for 16 hours. This yields the following composition:

5% $V_2O_5$-10% $B_2O_3$-$Al_2O_3$

The use of vanadia as an active metal is illustrated in the following tables.

In Table I, vanadia is compared with boria-alumina containing no active metal and boria-alumina having platinum as an active metal, as a catalyst for disproportionation of toluene.

TABLE I

| Catalyst | 950° F., 800 p.s.i.g. 0.5 LHSV, 3/1. $H_2/H'C$ | | |
|---|---|---|---|
| | 10% $B_2O_3$-$Al_2O_3$ | 5.0% $V_2O_5$ 10% $B_2O_3$-$Al_2O_3$ | 0.3 pt. 10% $B_2O_3$-$Al_2O_3$ |
| Conversion weight, percent feed | 41.4 | 45.5 | 36.5 |
| Δ conversion weight, percent per hour | 3.0 | 0.0 | 5.0 |

It is to be observed that the vanadia catalyst is substantially superior to the boria-alumina catalyst and is somewhat better than the platinum-boria-alumina catalyst. The particular platinum catalyst is highly effective in the present reaction. However, liquid recoveries with platinum are lower, naphthene production is higher, and the rate of change of catalyst activity is higher.

Table II shows the effect of vanadia concentration on catalyst activity and selectivity. The ideal concentration appears to be 4 to 6% by weight based on the finished catalyst.

TABLE II

| Catalyst | 10% $V_2O_5$ 10% $B_2O_3$-$Al_2O_3$ | 5% $V_2O_5$ 10% $B_2O_3$-$Al_2O_3$ |
|---|---|---|
| Conditions | (950° F., 800 p.s.i.g. 0.5 LHSV, 3/1 $H_2$) | |
| Conversion weight, percent feed | 16 | 45 |
| Δ conversion weight, percent per hour | 2.0 | 0 |

The following tables further exemplify the present invention.

TABLE III

| Catalyst | 10% $B_2O_3$- 2% ZnO/$Al_2O_3$ | 10% $B_2O_4$- 2% MnO/$Al_2O_3$ | |
|---|---|---|---|
| Feed | Toluene | Toluene | Toluene |
| Conditions: | | | |
| Temperature, °F | 950 | 950 | 1,000 |
| Pressure, p.s.i.g | 800 | 800 | 800 |
| LHSV | 0.5 | 0.5 | 1 |
| $H_2/H'C$ | 3 | 3 | 3 |
| Analysis, G.C., weight percent liquid product: | | | |
| <benzene | 13.3 | 6.4 | 1.9 |
| Benzene | 18.6 | 13.8 | 15.2 |
| Toluene | 53.6 | 71.2 | 75.5 |
| Xylene | 13.4 | 8.2 | 7.2 |
| >xylene | 1.1 | 0.4 | 0.2 |
| Conversion of toluene | 46.4 | 28.8 | 24.5 |

In accordance with the present invention, an integrated process for the production of benzene and para-xylene from toluene can be carried out with resultant high yields of these two valuable products. This process is best described by reference to the drawing.

In accordance with the drawing, toluene is introduced to the system through line 10, hydrogen is added through line 12 and these materials are passed over the catalyst of the present invention in the disproportionation reactor 14. The effluent passing through line 16 is passed to a flash drum for the removal of hydrogen and any light gases produced. These materials are discharged through line 18. Since little or no demethanation occurs, the hydrogen is substantially pure and may be recycled to the disproportionation reaction without further treatment. However, in some instances, further purification of the hydrogen is necessary before recycle or reuse. The liquid product passes through line 20 to a first distillation unit 22. In distillation unit 22, benzene is recovered as an overhead through line 24. The bottoms product from distillation unit 22 passes through line 26 to a second distillation unit 28. In distillation unit 28, toluene is removed as an overhead product and recycled to the disproportionation section through line 30. The bottoms product from distillation unit 28 is a mixture of xylenes which is discharged through line 32. This product may be withdrawn, as such, through line 34. Preferably, however, the xylene product is passed through line 36 to crystallization unit 38. In crystallization unit 38, para-xylene is selectively removed and withdrawn through line 40. The mother liquor from the crystallization section is passed through line 42 to an isomerization unit 44. Hydrogen is added through line 46. In the isomerization unit 44, the equilibrium concentration of para-xylene is re-established and the material may then be recycled through line 48 to crystallization unit 38 for further para-xylene separation.

The isomerization reaction should be carried out under more mild conditions than the disproportionation. Catalysts useful in the disproportionation reaction might also be used in the isomerization or conventional catalysts, such as platinum on silica-alumina, can be used. The isomerization may be carried out at temperatures of about 500 to 900° F., and preferably 550 to 650° F., pressure of 50 to 2000 p.s.i.g., and preferably 300 to 600 p.s.i.g., at a liquid hourly space velocity of 0.1 to 10, and utilizing a hydrogen-to-hydrocarbon mole ratio between about 1 and 20 to 1.

When reference is made herein to the Periodic System of Elements, the particular groupings referred to are as set forth in the Periodic Chart of the Elements in "The Merck Index," Seventh Edition, Merck & Co., Inc., 1960.

The term "alkyl transfer" of alkyl aromatics as used herein is meant to include disproportionation and transalkylation. Disproportionation, in turn, is meant to include conversion of two moles of a single aromatic, such as toluene, to one mole each of two different aromatics, such as xylenes and benzene. Transalkylation is meant to include conversion of one mole each of two different aromatics, such as xylenes and benzene, to one mole of

TABLE IV

| Catalyst | 5 CuO-10 $B_2O_3$ $Al_2O_3$ | 5 $V_2O_5$-2 $MnO_2$ 10 $B_2O_3$- $Al_2O_3$ | 5 $V_2O_5$-2 SnO 10 $B_2O_3$- $Al_2O_3$ | 5 $V_2O_5$-2 $K_2O$ 10 $B_2O_3$- $Al_2O_3$ | 5 $V_2O_5$-2 CeO 10 $B_2O_3$- $Al_2O_3$ |
|---|---|---|---|---|---|
| Feed | Toluene | Toluene | Toluene | Toluene | Toluene |
| Conditions: | | | | | |
| Temp., °F | 1,000 | 1,000 | 1,000 | 1,000 | 1,000 |
| Pressure, p.s.i.g | 800 | 800 | 800 | 800 | 800 |
| LHSV | 0.5 | 0.5 | 0.5 | 0.5 | 0.5 |
| $H_2/H'C$ | 3/1 | 3/1 | 3/1 | 3/1 | 3/1 |
| Recovery—volume percent | 86 | 93 | 88 | 88 | 92 |
| Toluene conversion | 55 | 34 | 19 | 15 | 33 |
| Product distribution: | | | | | |
| <benzene | 5.8 | 3.5 | 0.2 | 0.3 | 1.0 |
| Benzene | 28.7 | 19.7 | 5.2 | 2.7 | 16.4 |
| Toluene | 52.5 | 71.2 | 92.3 | 96.8 | 73.2 |
| Xylene | 12.0 | 5.3 | 2.2 | 0.2 | 8.6 |
| >xylene | 1.0 | 0.3 | 0.1 | | 0.8 |
| Carbon on catalyst, weight percent feed | 2.5 | 0.80 | 0.45 | 0.23 | 0.71 | a single different aromatic such as toluene. The alkyl transfer defined above is also to be distinguished from isomerization where there is no transfer of alkyl groups from one molecule to another but simply a shifting of alkyl group around the aromatic ring, such as isomerization of xylenes, or rupture of the ring of the alkyl side chain and rearrangement of split-off carbon atoms on the same molecule. The alkyl transfer is also to be distinguished from a hydrogen transfer reaction, such as the hydrogenation of aromatics, the dehydrogenation of cyclo-paraffins and like reactions.

We claim:

1. A process for the alkyl transfer of alkyl aromatics; comprising, contacting an alkyl aromatic feed material and hydrogen with a catalyst comprising about 2 to 20% by weight of a metal selected from the group consisting of Group I-B, Group II-B, Group V-B and Group VII-B of the Periodic System and mixtures thereof, and about 1 to 15% by weight of boria deposited on an alumina base, under conditions sufficient to cause said transfer disproportionation of said alkyl aromatics.

2. A process in accordance with claim 1 wherein the metal is a metal of Group I-B.

3. A process in accordance with claim 1 wherein the metal is a metal of Group II-B.

4. A process in accordance with claim 1 wherein the metal is a metal of Group V-B.

5. A process in accordance with claim 1 wherein the metal is a metal of Group VII-B.

6. A process in accordance with claim 1 wherein the feed material contains substantial volumes of toluene.

7. A process in accordance with claim 6 wherein unconverted toluene is separated from the alkyl transfer product and said unconverted toluene is recycled to the disproportionation step.

8. A process in accordance with claim 6 wherein xylenes are separated from the alkyl transfer product and para-xylene is separated from said xylenes.

9. A process in accordance with claim 8 wherein the xylenes remaining after the separation of para-xylene are subjected to isomerization conditions sufficient to produce additional para-xylene.

10. A process in accordance with claim 1 wherein the flow of feed material through the catalyst is interrupted periodically and teh flow of hydrogen is continued for a time sufficient to reactivate the catalyst.

11. A process in accordance with claim 1 wherein the flow of feed material and hydrogen through the catalyst is discontinued and the catalyst is calcined in air under conditions sufficient to reactivate the catalyst.

12. A process in accordance with claim 1 wherein the catalyst additionally contains about 1 to 15% by weight of a metal selected from the group consisting of Group I-A, Group II-A, Group IV and the rare earth metals of the Periodic System and mixtures thereof.

References Cited
UNITED STATES PATENTS

| | | | |
|---|---|---|---|
| 2,795,629 | 6/1957 | Boedeker | 260—668 |
| 3,260,764 | 7/1966 | Kovach et al. | 260—672 |

DELBERT E. GANTZ, Primary Examiner

G. E. SCHMITKONS, Assistant Examiner

U.S. Cl. X.R.

252—461, 462, 463, 464, 475, 476; 260—668, 669, 674